United States Patent
Turtinen et al.

(10) Patent No.: US 9,078,207 B2
(45) Date of Patent: Jul. 7, 2015

(54) METHOD AND APPARATUS FOR TIMING ADVANCE ESTIMATION

(75) Inventors: Samuli Turtinen, Ii (FI); Sami-Jukka Hakola, Kempele (FI); Timo Kalevi Koskela, Oulu (FI); Vinh Van Phan, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 495 days.

(21) Appl. No.: 12/949,368

(22) Filed: Nov. 18, 2010

(65) Prior Publication Data
US 2012/0127964 A1 May 24, 2012

(51) Int. Cl.
*H04W 56/00* (2009.01)

(52) U.S. Cl.
CPC .................. *H04W 56/0045* (2013.01)

(58) Field of Classification Search
CPC .................................................. H04W 56/0045
USPC ................................. 370/336, 350; 455/501
See application file for complete search history.

(56) References Cited

U.S. PATENT DOCUMENTS

| | | | |
|---|---|---|---|
| 2004/0137912 A1* | 7/2004 | Lin .......................... | 455/456.1 |
| 2010/0054237 A1 | 3/2010 | Han et al. | |
| 2010/0158050 A1* | 6/2010 | Yang ....................... | 370/498 |
| 2010/0222068 A1* | 9/2010 | Gaal et al. ............... | 455/450 |
| 2012/0178482 A1* | 7/2012 | Seo et al. ................. | 455/501 |

FOREIGN PATENT DOCUMENTS

| | | |
|---|---|---|
| EP | 0981255 A2 | 2/2000 |
| EP | 2365717 A1 | 9/2011 |
| WO | 2007075559 A2 | 7/2007 |
| WO | 2007117186 A1 | 10/2007 |
| WO | 2010051845 A1 | 5/2010 |

OTHER PUBLICATIONS

International Search Report and Written Opinion dated Mar. 23, 2012, PCT Application No. PCT/IB2011/054576, 13 pages.
Sahin, Mustafa E., et al., "Opportunity Detection for OFDMA-Based Cognitive Radio Systems with Timing Misalignment", IEEE Transactions on Wireless Communications, vol. 8, No. 10, Oct. 2009, pp. 5300-5313.
Laroia, Rajiv, "Future of Wireless? The Proximate Internet", COMSNETS, Jan. 7, 2010, 38 pages.

* cited by examiner

*Primary Examiner* — Wanda Z Russell
(74) *Attorney, Agent, or Firm* — Squire Patton Boggs (US) LLP

(57) ABSTRACT

In accordance with an example embodiment of the present invention, an apparatus, comprising at least one processor; and at least one memory including computer program code, the at least one memory and the computer program code configured to, with the at least one processor, cause the apparatus to perform at least the following: determine a first timing associated with a first signal; detect a second timing associated with a second signal; and estimate a timing advance value based at least in part on the detected first timing and the second timing, is disclosed.

19 Claims, 3 Drawing Sheets

METHOD AND APPARATUS FOR TIMING ADVANCE ESTIMATION

TECHNICAL FIELD

The present application relates generally to wireless networks, more specifically, relates to method and apparatus for timing advance estimation.

BACKGROUND

Recently, integration of new network topologies into a cellular network topology gains more and more attractions and interests both in industry and academy. For example, heterogeneous networks research is one of ongoing study items in the third generation partnership project (3GPP) standardization for long term evolution (LTE) and long term evolution-advanced (LTE-A). The current research in LTE/LTE-A is to deploy macros, micros, picos, and/or femtos cells as well as relays in the same spectrum, and to enable heterogeneous local communication directly among devices and machines either with or without supervision of the cellular network or cognitive femtos.

The heterogeneous local communication may include: network controlled or autonomous device-to-device (D2D) communication including communication in a cluster of devices, a grid or group of local machines communicating in order to perform certain tasks in a co-operative way, an advanced device acting as a gateway for a bunch of low-capability devices or machines to access the network, and an autonomous femto cell operation.

The cellular network has downlink resources and uplink resources. Using the downlink resources, a cellular base station transmits data or signal to the cellular users; using the uplink resources, the cellular users transmit data or signal to the cellular base station.

SUMMARY

Various aspects of examples of the invention are set out in the claims.

According to a first aspect of the present invention, an apparatus, comprising at least one processor; and at least one memory including computer program code, the at least one memory and the computer program code configured to, with the at least one processor, cause the apparatus to perform at least the following: determine a first timing associated with a first signal; detect a second timing associated with a second signal; and estimate a timing advance value based at least in part on the detected first timing and the second timing, is disclosed.

According to a second aspect of the present invention, a method, comprising determining a first timing associated with a first signal; detecting a second timing associated with a second signal; and estimating a timing advance value based at least in part on the detected first timing and the second timing, is disclosed.

According to a third aspect of the present invention, a computer program product comprising a computer-readable medium bearing computer program code embodied therein for use with a computer, the computer program code comprising: code for determining a first timing associated with a first signal; code for detecting a second timing associated with a second signal; and code for estimating a timing advance value based at least in part on the detected first timing and the second timing, is disclosed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
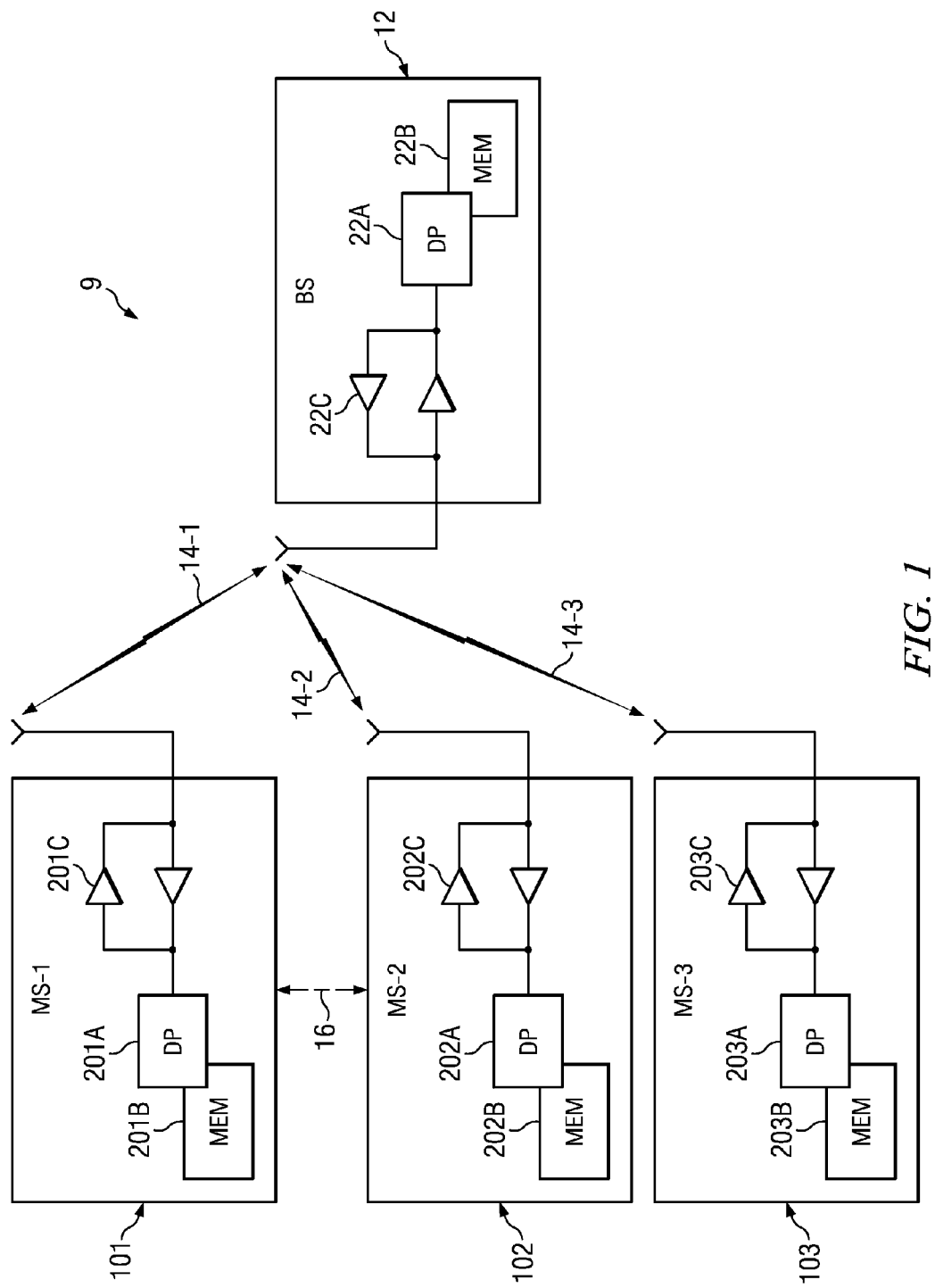
FIG. 1 shows a simplified diagram of various electronic devices that are suitable for use with example embodiments of the invention.

FIG. 1 shows a simplified diagram of various electronic devices that are suitable for use with example embodiments of the invention. In FIG. 1, a heterogeneous system 9 includes at least one base station (BS) 12 and a plurality of mobile stations (MSs). MS-3 103 has cellular radio link 14-3 with BS 12. MS-1 101 and MS-2 102 have heterogeneous local link 16 with each other. The BS 12 may be cellular linked with MS-1 101 and MS-2 102 by cellular radio link 14-1 and 14-2 respectively when necessary. The links 14-1, 14-2, 14-3 and 16 are wireless links, complying with one or more radio standardizations, for example LTE, LTE-A or D2D, as non-limiting examples.

The integration of the local heterogeneous communication into the cellular network means that the devices with heterogeneous local link try to find and utilize radio resources of the cellular system using as low amount of cellular network assistance as possible and causing as low interference to the cellular users as possible. It is desirable to make the local heterogeneous communication take place on the cellular network's uplink resources due to following considerations: the cellular network may prevent the heterogeneous devices transmitting on cellular downlink resources, to control interference caused by the heterogeneous devices to the cellular users, the heterogeneous devices may maintain synchronization to the network by listening cellular downlink common channels, and the network may page the heterogeneous devices using downlink resources.

When the local heterogeneous communication is operating in uplink resources of the overlaying cellular network, the interference situation the local heterogeneous communication caused may vary a lot between adjacent frames as the cellular uplink resources may be allocated dynamically to different cellular users. Therefore, it is desired that the devices of the local heterogeneous communication would be synchronized to the victim cellular cell to reuse the cellular resources effectively.

In the cellular network, timing advance may be used to have the cellular users at different locations synchronized. A base station, for example BS 12, controls how much of timing advance for each cellular user to make the signals from different users arrive at the base station at the same timing. The timing advance for a user corresponds to the length of time a signal takes to reach the base station from the user. Under the control of the base station, the cellular users adjust their start transmission timing to some extent.

In an embodiment, the BS 12 includes a suitable controller, such as at least one data processor (DP) 22A, operatively coupled with a memory (MEM) 22B, and at least one wireless transceiver 22C. The MS-1 101 includes a suitable controller, such as at least one data processor (DP) 201A, operatively coupled with a memory (MEM) 201B, and at least one wireless transceiver 201C. The MS-2 102 includes a suitable controller, such as at least one data processor (DP) 202A, operatively coupled with a memory (MEM) 202B, and at least one wireless transceiver 202C. The MS-3 103 includes a suitable controller, such as at least one data processor (DP) 203A, operatively coupled with a memory (MEM) 203B, and at least one wireless transceiver 203C.

In an embodiment, the memory 201B, 202B, or 203B includes program instructions (PROG), executable by the associated DP 201A, 202A, or 203A, for operation in accordance with the example embodiments, as described in further detail below. The PROGs may be embodied in software, firmware, hardware, and/or the like, as appropriate. In general, the example embodiments may be implemented at least in part by computer software executable by the DPs 201A, 202A, or 203A, or by hardware, by a combination of software and hardware, and/or the like.

The memories 201B, 202B, 203B and 22B may be of any type suitable to the local technical environment and/or the like. The memories 201B, 202B, 203B and 22B may be implemented using any suitable data storage technology, such as semiconductor-based memory devices, flash memory, magnetic memory devices and systems, optical memory devices and systems, fixed memory, removable memory, and/or the like, as non-limiting examples.

The DPs 201A, 202A, 203A and 22A may be of any type suitable to the local technical environment. The DPs 201A, 202A, 203A and 22A may include one or more of general purpose computers, special purpose computers, microprocessors, digital signal processors (DSPs), processors based on a multi-core processor architecture, and/or the like, as non-limiting examples.

The MSs may include, but are not limited to, a cellular telephone, a personal digital assistant (PDA) having wireless communication capabilities, a portable and desktop computer having wireless communication capabilities, an image capture device such as digital camera having wireless communication capabilities, a gaming device having wireless communication capabilities, a music storage and playback appliance having wireless communication capabilities, an Internet appliance permitting wireless Internet access and browsing, as well as a portable unit or terminal that incorporate combinations of such functions. Note that the MS (MS-1 101, MS-2 102, or MS-3 103) may be a mobile device, a device intended to be used in one location for example a personal computer, and/or the like, as non-limiting examples.

The heterogeneous local link 16 between MS-1 101 and MS-2 102 may use cellular uplink resources controlled by BS 12. In case a cellular MS for example MS-3 103 is close to MS-1 101 or MS-2 102. The heterogeneous local link 16 may cause interference to the cellular link between MS-3 103 and BS 12. It is desirable to have MS-1 101 and/or MS-2 102 synchronized with BS 12 of the cellular network.

MS-1 101 and/or MS-2 102 may listen to BS 12's common downlink transmissions such as cell broadcast information, primary synchronization signal (PSS) and secondary synchronization signal (SSS) by 14-1 and 14-2 respectively. MS-1 101 and/or MS-2 102 may frequency and frame synchronized with the BS 12. Restated, the MS in heterogeneous local communication may tune to the frequency of a cellular cell and obtain the frame timing of the cell. But for the timing advance value, the MS in heterogeneous local communication (called as local device hereafter for simplicity of explanation) is not able to read it from the available common downlink transmissions as the timing advance value is signaled to the cellular MS specifically, for example by cellular link 14-3.

To obtain the timing advance value, one option is to have the local device perform random access procedure on physical random access channel (PRACH). Considering the number of local devices may be huge, the PRACH load may expand substantially, thus the time for getting the local device synchronized with the cellular cell may be quite long.

For the purpose of explanation, 3GPP specified frame structure type 2 is used as example in the following description to provide a thorough understanding of the invention. However, embodiments are not limited to these examples and example embodiments may be practiced with other frame structures.

Figure 2:
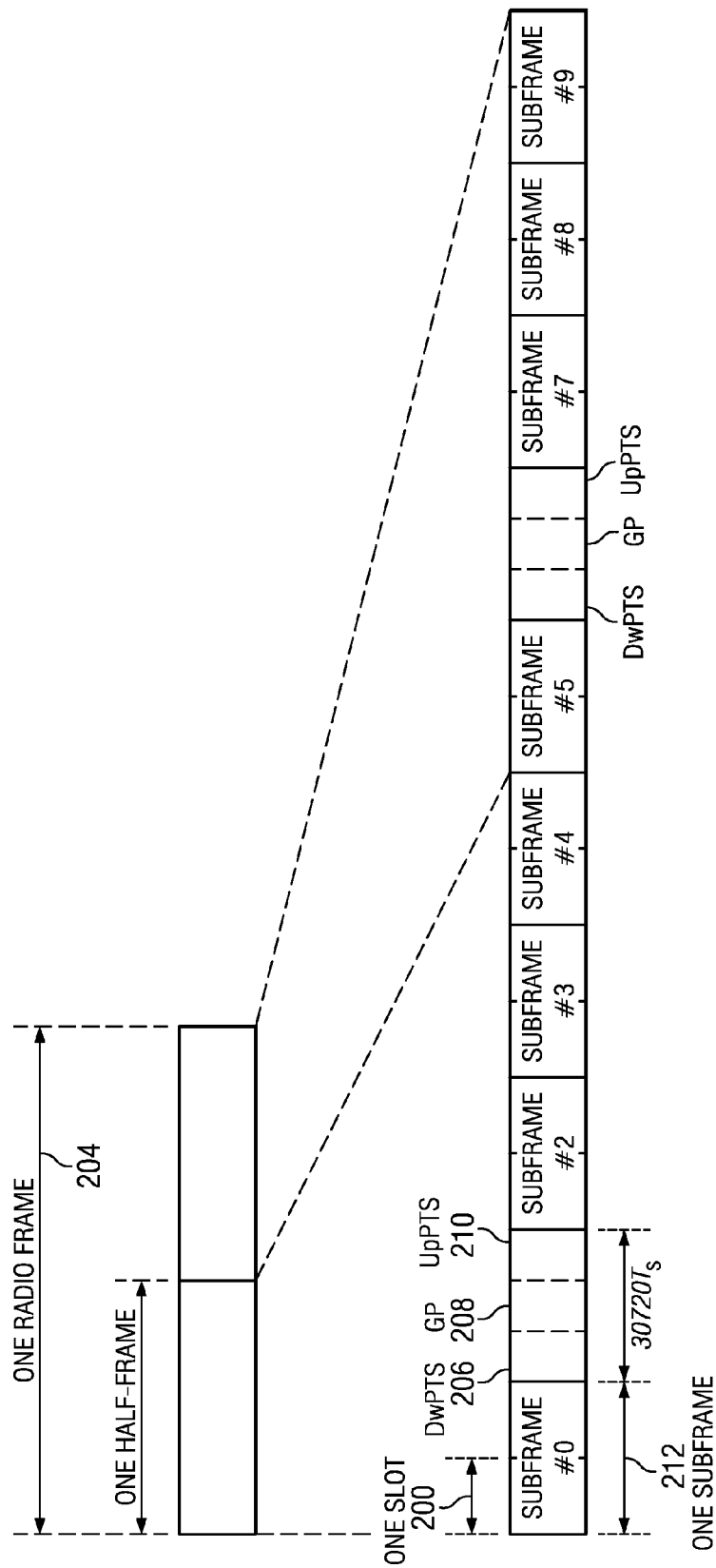
FIG. 2 shows a frame structure type 2 specified by 3GPP standardization in accordance with example embodiments of the invention.

FIG. 2 shows a frame structure type 2 specified by 3GPP standardization in accordance with example embodiments of the invention.

In an example embodiment, two frame structure types, frame structure type 1 and frame structure type 2, are specified in 3GPP technical specification 36.211. Frame structure type 2 is applicable to time division duplex (TDD). In FIG. 2, the size of various fields in the time domain is expressed as a number of time units $T_s=1/(15000 \times 2048)$ seconds. In an example embodiment, one radio frame 204 is of length $T_f=307200 \cdot T_s=10$ ms, and, for example, consists of two half-frames of length $153600 \cdot T=5$ ms each. In such an example embodiment, each half-frame consists of five subframes of length $30720 \cdot T_s=1$ ms. One subframe 212 is defined as two slots. One slot 200 is of length $T_{slot}=15360 \cdot T_s=0.5$ ms.

In an example embodiment relating to one radio frame, there exists one, two, or more special subframes in either first half-frame only and/or both half-frames. The special subframe comprises a downlink pilot time slot (DwPTS) 206, guide period (GP) 208 and uplink pilot time slot (UpPTS) 210 fields. Subframes 0 and 5 and DwPTS are reserved for downlink transmission. UpPTS and the subframe immediately following the special subframe are always reserved for uplink transmission.

In an example embodiment, the DwPTS 206 is used for downlink synchronization. The DwPTS comprises a certain downlink synchronization (SYNC-DL) sequence. A mobile station may acquire the timing of the DwPTS by correlating with the SYNC-DL sequence. The GP 208 is used to overcome the round trip delay of a cell and to have the mobile station transceiver prepared for uplink transmission from downlink reception. The UpPTS 210 is used for uplink synchronization. The UpPTS comprises a certain uplink synchronization (SYNC-UL) sequence. A base station may determine the received power level and the received timing from a mobile station by correlating with the SYNC-UL sequence.

In an example embodiment, the total length of DwPTS, GP and UpPTS being equal to $30720 \cdot T_s=1$ ms. The length of DwPTS and UpPTS is configured by cellular network, for example using special subframe patterns. The configured special subframe pattern may be included in system information and broadcast by BS on the whole cell level to the cellular users. The BS may use subframe assignment configuration to indicate which subframe is configured as uplink subframe or downlink subframe. The subframe assignment configuration may be included in the system information as well.

In an example embodiment, a device, for example MS-1 101, MS-2 102, or MS-3 103 of FIG. 1, may listen to the system information from the cellular network, and acquire the subframe configuration, for example the above mentioned special subframe pattern and/or subframe assignment configuration, of the cellular network. For example, the device could be a local device that is under heterogeneous local communication with another local device, a cellular device without synchronized with the BS, and/or the like. After acquiring the cellular network's subframe configuration, the device is able to map the cellular subframes/slots onto the device's own time domain as the device is observing as the BS.

Figure 3:
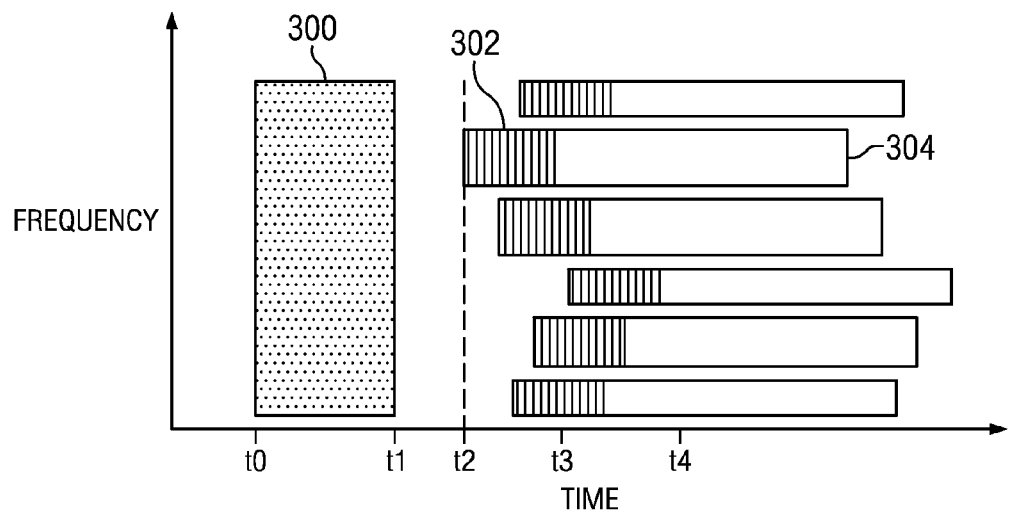
FIG. 3 illustrates a view of special subframe situation observed at a device in accordance with example embodiments of the invention.

FIG. 3 illustrates a view of special subframe situation observed at a device in accordance with example embodiments of the invention. For example, the device could be MS-1 101, MS-2 102, or MS-3 103 of FIG. 1. In an example embodiment, the special subframe could be the special subframe of DwPTS, GP and UpPTS of FIG. 2.

In an example embodiment, relating to FIG. 3, the horizontal axis represents time axis according to the cellular frame timing, t0 represents the start timing of DwPTS, t1 represents the start timing of GP, t3 represents the start timing of UpPTS, and t4 represents the start timing of the uplink subframe followed by the UpPTS. The vertical axis represents frequency axis observed at the device. Block 300 represents DwPTS field observed by the device. As the device may be around multiple cellular users, it may observe multiple cellular users' UpPTS (shown as blocks filled with vertical lines in FIG. 3) and uplink subframe (shown as blank blocks in FIG. 3). The device may be closer to the device's surrounding cellular users than the BS does, so the observed UpPTS field is ahead of the corresponding UpPTS field mapped on time axis. Block 302 represents the earliest arrived UpPTS field; t2 represents the earliest arrival start timing of UpPTS. Block 304 represents the uplink subframe followed after the earliest arrived UpPTS.

In an example embodiment, the surrounding cellular users are synchronized with the cellular base station, for example BS 12 of FIG. 1. In case the device synchronizes the device's transmission with one of the device's surrounding cellular users' uplink transmission, for example by utilizing the same timing advance value as the surrounding cellular user, the device could be viewed as synchronized with the cellular network, thus less interference caused by the device to the cellular network.

In an example embodiment, the device may estimate the timing advance value of the cellular user based on the timing relationship illustrated in FIG. 3. According to FIG. 3, GP period is equal to t3 minus t1. In an example embodiment, DLtoUL value is equal to the start timing of the observed UpPTS minus t1. Then, the timing advance value is equal to GP period minus DLtoUL value.

In an example embodiment, the earliest arrived signal may be from the nearest cellular user to the device. In an example embodiment, the timing advance value=t3−t2. The device may be synchronized to the nearest cellular user, for example by using the same timing advance value as the nearest cellular user in the device's transmission.

In an example embodiment, the device may associate the device's transmission timing with the surrounding cellular user. For example, the device may align the device's transmission timing with the surrounding cellular user. The device may transmit signal with a timing that uses same timing advance value as the estimated timing advance value of the surrounding cellular user. The device may vary the device's timing a bit from the surrounding cellular user, for example considering the device's distance from the surrounding cellular user. By the transmission timing association, the device could be viewed as synchronized with the cellular network as the surrounding cellular user does, without random access procedure, without dedicated timing advance control from the cellular network to the device.

Figure 4:
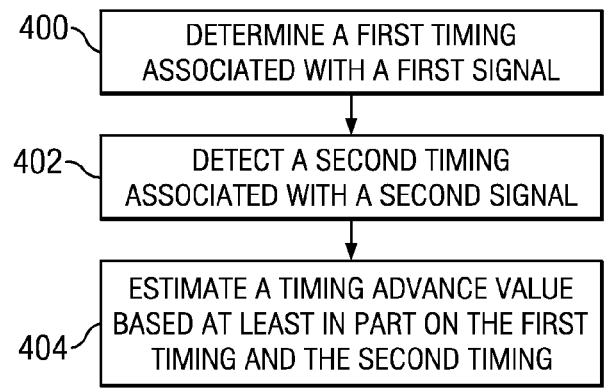
FIG. 4 is a flow diagram showing operations of an example method for timing advance estimation according to an embodiment of the invention.

FIG. 4 is a flow diagram showing operations of an example method for timing advance estimation according to an embodiment of the invention. In an example embodiment, the method of FIG. 4 is performed by a device, for example, MS-1 101, MS-2 102, or MS-3 103 of FIG. 1.

At block 400, the MS-1 101 determines a first timing associated with a first signal. In an example embodiment, a cellular base station, for example BS 12 of FIG. 1, may transmit a cellular downlink signal, for example DwPTS, primary synchronization signal (PSS), secondary synchronization signal (SSS), or broadcast signal. In another embodiment, a cellular device, for example MS-3 103 of FIG. 1, may transmit a cellular uplink signal, for example UpPTS. The MS-1 101 determines a first timing associated with the cellular downlink signal and/or the cellular uplink signal. The first timing associated with the first signal could be the start timing of the first signal, the end timing of the first signal, another timing that could be used as a reference to determine the timing of the first signal, and/or the like for example the start or end timing of another downlink or uplink signal.

In an example embodiment, the MS-1 101 detects broadcast signal to acquire the cellular system information, and obtain the frame timing of the cellular network. In an example embodiment, the MS-1 101 may receive the cellular system information of cellular subframe configuration, determine the position of the first signal within a frame according to the cellular subframe configuration information, and determine the first timing associated with the first signal accordingly. For example, the MS-1 101 is able to determine where DwPTS takes place in the frame once it knows the special subframe configuration from the system information. As the MS-1 101 has the frame timing of the cellular network already when receiving the system information, it may place the DwPTS by shifting to the DwPTS's position on the frame timing, not necessary to detect the DwPTS itself.

At block 402, the MS-1 101 detects a second timing associated with a second signal. In an example embodiment, cellular devices, for example MS-3 103 of FIG. 1, may transmit cellular uplink signals, for example UpPTS and/or uplink transmissions followed after UpPTS. The MS-1 101 detects a second timing associated with cellular device's uplink signal. For example, the MS-1 101 may detect the UpPTS transmitted by the cellular devices. In an example embodiment, the MS-1 101 detects the earliest cellular uplink signal observed by the MS-1 101. In another example embodiment, the MS-1 101 detects the strongest cellular uplink signal observed by the MS-1 101. The second timing associated with the second signal could be the start timing of the second signal, the end timing of the second signal, another timing that could be used as a reference to determine the timing of the second signal, and/or the like for example the start or end timing of another uplink signal.

At block 404, the MS-1 101 estimates a timing advance value based at least in part on the first timing and the second timing. In an example embodiment, the MS-1 101 may reflect the first timing and the second timing onto its own time axis, and estimate the timing advance value in view of the relative position the first timing and the second timing.

In an example embodiment, the MS-1 101 may receive the cellular system information which comprises cellular subframe configuration information. With the cellular subframe configuration information, the MS-1 101 may determine a guard period length and/or the position of the first signal and the second signal within a frame. The MS-1 101 may determine a time difference between the first timing and the second timing. In an example embodiment, the MS-1 101 estimates the timing advance value based on the time difference between the first timing and the second timing. In another example embodiment, the MS-1 101 may estimate the timing advance value based on the determined guard period and the time difference between the first timing and the second timing.

In an example embodiment, the time difference is derived by subtracting the end of the first signal from the start of the second signal, and/or, the timing advance value is derived by subtracting the time difference from the guard period. In another example embodiment, the time difference is derived by subtracting the end of the first signal from the earliest arrival timing of the second signal, and/or the timing advance value is derived by subtracting the time difference from the guard period. In a further example embodiment, the time difference is derived by subtracting the start of the first signal from the start of the second signal, and the timing advance value is equal to the time difference.

Figure 5:
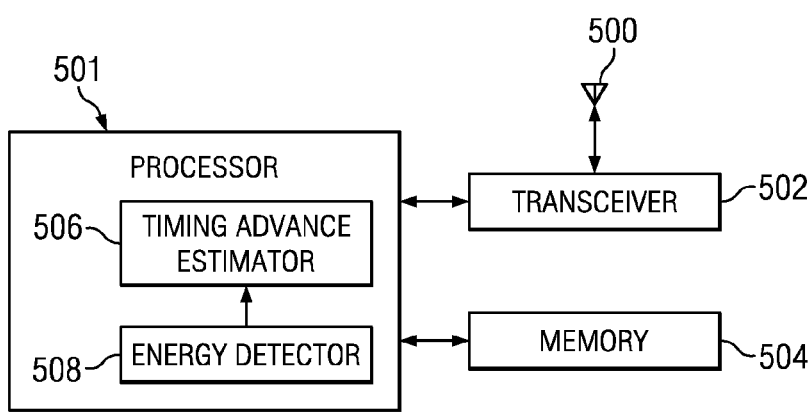
FIG. 5 shows a simplified block diagram of an embodiment of a device that provides an environment for application of the example embodiments of this invention.

FIG. 5 shows a simplified block diagram of an embodiment of a device that provides an environment for application of the example embodiments of this invention. For example, the device could be MS-1 101, MS-2 102, or MS-3 103 of FIG. 1. The block diagram may be embedded in the device as a component of the device.

The device, for example the local device MS-1 101 of FIG. 1, comprises antenna 500, processor 501, transceiver 502, and memory 504. The memory 504 is coupled to the processor 501 for storing programs and data of a temporary or more permanent nature. The transceiver 502 is coupled to the antenna 500 and to the processor 501 for bidirectional wireless communications, for example with another local device MS-2 102 of FIG. 1 or with the BS 12 of FIG. 1.

In an example embodiment, the processor 501 comprises timing advance estimator 506 and energy detector 508. The timing advance estimator 506 is coupled to the energy detector 508. The timing advance estimator 506 is configured to estimate a timing advance value based at least in part on one or more inputs provided by the energy detector 508. In an example embodiment, the timing advance estimator 506 may realize the block 400, block 402 and block 406 of FIG. 4.

In an example embodiment, the energy detector 508 is configured to detect wireless signals. The energy detector 508 may estimate the time-of-arrival (ToA) of a detected cellular signal, for example by comparing the detected energy with a certain threshold value. For illustrative purposes, please consider the following example. A threshold value may be set as 0.5 in view of a normalized detected energy. In such an example, the normalized detected energy of a cellular signal is above 0.5 and the energy detector 508 considers the cellular signal is detected.

In an example embodiment, the energy detector 508 may be configured to detect the first signal, such as the first signal of FIG. 4. For example, the energy detector 508 may detect common downlink signal to obtain the frame timing of the cellular network. In an example embodiment, the energy detector 508 may detect DwPTS to obtain the position of the DwPTS within the frame.

In an example embodiment, the energy detector 508 may be configured to detect the second signal of FIG. 4. The energy detector 508 may estimate the time-of-arrival (ToA) of the earliest detected cellular uplink signal. The earliest detected cellular uplink signal may be from the very nearby cellular user. In an example embodiment, the device may receive thermal noise and downlink transmission of very distant cells together with the surrounding cellular uplink transmissions, the energy detector 508 may detect the surrounding cellular uplink transmission easily.

In another example embodiment, the energy detector 508 may consider cellular random access transmissions when detecting the surrounding cellular uplink transmission. Take the frame structure of FIG. 2 as an example, when PRACH preamble format 4 is configured, the random access preamble comprises a cyclic prefix of length 448 Ts and a sequence part of length 4096 Ts. The PRACH transmission will overlap with the guard period of special subframe, thereby overlap with the surrounding cellular uplink transmissions, thus timing advance estimation may be disturbed. For the sake of cellular system information, the device may receive the PRACH information for example PRACH preamble format configuration and PRACH resource allocation. The device may obtain the PRACH preamble format configuration and the PRACH resources from the cellular system information, and determine where the PRACH transmission would take place. The energy detector 508 may filter out the PRACH transmission from the detected signals and use the rest detected signals for timing advance estimation.

In an example embodiment, the processor 501 may determine the transmission timing of the device at least in part based at least in part on the estimated timing advance value provided by the timing advance estimator 506. The processor 501 may instruct the transceiver 502 with which timing to transmit signals.

In an example embodiment, the processor 501 may take the estimated timing advance value as a reference to determine the device's transmission timing. The processor 501 may align the device's transmission timing with the cellular user from which the timing advance value is estimated. The processor 501 may adjust the device's transmission timing a bit from the cellular user's transmission timing.

Without in any way limiting the scope, interpretation, or application of the claims appearing below, a technical effect of one or more of the example embodiments disclosed herein is random access resource saving. Another technical effect of one or more of the example embodiments disclosed herein is timing advance signaling overhead saving. Another technical effect of one or more of the example embodiments disclosed herein is interference to surrounding users reduced.

Embodiments of the present invention may be implemented in software, hardware, application logic or a combination of software, hardware and application logic. The software, application logic and/or hardware may reside on a device with heterogeneous local communication, or a cellular device not yet synchronized to a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    at least one processor; and
    at least one memory including computer program code
    the at least one memory and the computer program code configured to, with the at least one processor, cause the apparatus to perform at least the following:
    determine a first timing associated with a first signal, wherein the first signal corresponds to a cellular downlink signal transmitted by a cellular base station;
    detect a second timing associated with a second signal, wherein the second signal corresponds to a cellular uplink signal transmitted by a cellular device, wherein the first signal is a signal different from the second signal;
    estimate a timing advance value based at least in part on the detected first timing and the second timing, wherein the timing advance value is estimated by subtracting a time difference between the first timing and the second timing from a guard period, the timing advance value corresponds to a difference between a start timing of a first uplink pilot time slot a id a second unlink pilot time slot, and the second uplink pilot time slot is the earliest arrived uplink pilot time slot field; and
    synchronize to a surrounding cellular user by transmitting signals using the estimated timing advance value.

2. The apparatus according to claim 1, wherein the apparatus is caused to further perform:
    determine a time difference between the first timing and the second timing, wherein the timing advance value is estimated based at least in part on the determined time difference.

3. The apparatus according to claim 1, wherein the apparatus is caused to further perform:
    detect a common downlink signal to obtain frame timing, wherein the first timing is determined at least in part based on the obtained frame timing.

4. The apparatus according to claim 1, wherein the first signal comprises a downlink signal or an uplink signal and the second signal comprises an uplink signal.

5. The apparatus according to claim 1, wherein the first signal comprises a downlink pilot time slot, and the second signal comprises an uplink pilot time slot.

6. The apparatus according to claim 1, wherein the second timing associates with at least one of the start and the end of the second signal.

7. The apparatus according to claim 1, wherein the estimated timing advance value associates with a cellular user that is synchronized with a cellular base station.

8. The apparatus according to claim 1, wherein the apparatus is caused to further perform:
    receive system information from a remote node; and
    determine the position of the first signal and the second signal within a frame based on the received system information,
    wherein the system information comprises at least one of a preamble format configuration of a physical random access channel, and a resource allocation of the physical random access channel and,
    wherein the physical random access channel transmission is filtered out of the first signal and the second signal with the remainder of the first and the second signal being configured for the timing advance estimation.

9. The apparatus according to claim 1, wherein the first timing associates with the end of the first signal.

10. A method, comprising:
    determining a first timing associated with a first signal, wherein the first signal corresponds to a cellular downlink signal transmitted by a cellular base station;
    detecting a second timing associated with a second signal, wherein the second signal corresponds to a cellular uplink signal transmitted by a cellular device, wherein the first signal is a signal different from the second signal;
    estimating a timing advance value based at least in part on the detected first timing and the second timing, wherein the timing advance value is estimated by subtracting a time difference between the first timing and the second timing from a guard period, the timing advance value corresponds to a difference between a timing of a first uplink pilot time slot and a second uplink pilot time slot, and the second uplink pilot time slot is the earliest arrived uplink pilot time slot field; and
    synchronizing to a surrounding cellular user by transmitting signals using the estimated timing advance value.

11. The method according to claim 10, wherein the estimating the timing advance value further comprises determining a time difference between the first timing and the second timing, wherein the timing advance value is estimated based at least in part on the determined time difference.

12. The method according to claim 10, wherein the determining the first timing further comprises detecting a common downlink signal to obtain frame timing.

13. The method according to claim 10, wherein the first signal comprises a downlink signal or an uplink signal and the second signal comprises an uplink signal.

14. The method according to claim 10, wherein the first signal comprises a downlink pilot time slot, the second signal comprises an uplink pilot time slot.

15. The method according to claim 10, further comprising:
    transmitting signals with a timing associated with the estimated timing advance value.

16. The method according to claim 10, wherein the method further comprises:
    receiving system information from a remote node; and
    determining the position of the first signal and the second signal within a frame based on the received system information,
    wherein the system information comprises at least one of a preamble format configuration of a physical random access channel, and a resource allocation of the physical random access channel and,
    wherein the physical random access channel transmission is filtered out of the first signal and the second signal with the remainder of the first and the second signal being configured for the timing advance estimation.

17. A computer program product comprising a non-transitory computer-readable medium bearing computer program code embodied therein for use with a computer, the computer program code comprising:

code for determining a first timing associated with a first signal, wherein the first signal corresponds to a cellular downlink signal transmitted by a cellular base station;

code for detecting a second timing associated with a second signal, wherein the second signal corresponds to a cellular uplink signal transmitted by a cellular device, wherein the first signal is a signal different from the second signal;

code for estimating a timing advance value based at least in part on the detected first timing and the second timing, wherein the timing advance value is estimated by subtracting a time difference between the first timing and the second timing from a guard period, the timing advance value corresponds to a difference between a start timing of a first uplink pilot time slot and a second uplink pilot time slot, and the second uplink pilot time slot is the earliest arrived uplink pilot time slot field; and code for synchronizing to a surrounding cellular user by transmitting signals using the estimated timing advance value.

18. The computer program product according to claim 17, further comprising code for transmitting signals with a timing associated with the estimated timing advance value.

19. The computer program product according to claim 17, further comprising:

code for receiving system information from a remote node; and code for determining the position of the first signal and the second signal within a frame based on the received system information, wherein the system information comprises at least one of a preamble format configuration of a physical random access channel, and a resource allocation of the physical random access channel and, wherein the physical random access channel transmission is filtered out of the first signal and the second signal with the remainder of the first and the second signal being configured for the timing advance estimation.

* * * * *